United States Patent Office 2,799,694
Patented July 16, 1957

2,799,694

POLYFUNCTIONAL HALOGENATED AROMATIC COMPOUNDS

Sidney D. Ross and Moushy Markarian, Williamstown, Mass., assignors to Sprague Electric Company, North Adams, Mass., a corporation of Massachusetts No Drawing. Application February 18, 1953, Serial No. 337,682

5 Claims. (Cl. 260—453)

Our present invention relates to a new class of condensable compounds and to novel condensation products made therefrom. More specifically, the invention concerns certain polyfunctional, halogenated, aromatic compounds and products obtained by condensing them with other compounds having at least one complementary functional group.

Resins used in lacquers, enamels and like coating compositions have for many years been made by condensing polybasic acids, such as phthalic and maleic or their anhydrides, with polyhydric alcohols, such as glycerin and glycol. In more recent years there has been a tremendous development in the production of resinous products by the condensation of components each containing several functional groups that are complementary to (i. e., react readily with) each other. Outstanding in this development has been the production of fiber-forming resins of extremely high molecular weight by the condensation of dibasic acids with diamines. A great many variations have been made in the functional groups employed as well as in the radicals to which they are attached. In some cases complementary functional groups have been attached to the same radical, thus permitting self-condensation and dispensing with the need for a second component.

It is an object of our invention to produce new, polyfunctional halogenated aromatic compounds that are capable of being condensed with other compounds containing at least one complementary functional group to produce useful condensation products. A further object is to prepare novel resins by the condensation of our new condensable compounds with other suitable components. These novel resinous condensation products are characterized by flame resistance, high softening points, toughness and outstanding dielectric properties. Additional objects will become apparent from the following description and claims.

The foregoing objects are attained in accordance with our invention by producing certain halogenated aromatic compounds which are substituted by at least two alkoxy groups, said alkoxy groups being joined in turn to functional groups. Our invention also concerns the novel condensation products prepared by condensing such halogenated aromatic compounds with each other or with a different component having at least one complementary functional group. More particularly, our invention is concerned with bifunctional compounds in which the two functional groups are substituted on alkoxy radicals containing up to six carbon atoms, which in turn are substituted on a benzene ring that is substituted by chlorine on each of its four remaining carbon atoms. The functional groups, such as hydroxyl or carboxyl, are not substituted directly on the ring carbons of the aromatic nucleus, but are displaced therefrom by at least one carbon atom of the alkoxy radicals. We have found that by this expedient the halogen atoms occupying the remaining ring carbon positions will not inhibit the condensation reaction to any appreciable extent and at the same time will not give rise to unimolecular loss of hydrochloric acid, since halogen atoms and hydrogen atoms do not appear upon the same carbon atom or upon adjacent carbon atoms in our new condensable compounds.

The condensable compounds produced and employed in accordance with our invention conform to the general formula:

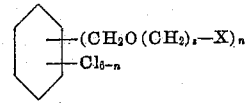

wherein $s$ is an integer from 0 to 6, X is a functional group selected from the class consisting of carboxyl, isocyanate, chloroformate, hydroxyl, thiol, and amino radicals, and $n$ is an integer from 1 to 3.

Another more limited class of compounds are those conforming to the general formula:

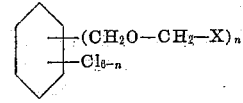

where X is a functional group selected from the class consisting of carboxyl, isocyanate, chloroformate, hydroxyl, thiol, and amino radicals, and $n$ is the integer 2 or 3.

Of specific interest in connection with our invention are compounds conforming to the general formula:

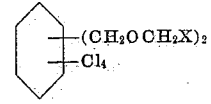

wherein X has the same significance as above. These bifunctional compounds are particularly useful for the production of highly condensed, linear condensation products. Representative compounds falling within this category are: bis-(carboxymethyl ether) of 1,4 bis-(hydroxymethyl) 2,3,5,6 tetrachlorobenzene; bis(carboxymethyl ether) of 1,2 bis(hydroxymethyl) 3,4,5,6 tetrachlorobenzene; bis(hydroxyethyl ether) of 1,4 bis(hydroxymethyl) 2,3,5,6 tetrachlorobenzene; bis(ωhydroxy 2 butenyl ether) of 1,4 bis(hydroxymethyl) 2,3,5,6 tetrachlorobenzene; bis(ωhydroxy 2 butynyl ether) of 1,4 bis-(hydroxymethyl) 2,3,5,6 tetrachlorobenzene; bis(carboxyethyl ether) of 1,4 bis(hydroxymethyl) 2,3,5,6 tetrachlorobenzene; bis(aminopropyl ether) of 1,4 bis(hydroxyethyl) 2,3,5,6 tetrachlorobenzene; bis(thiobutyl ether) of 1,3 bis(hydroxymethyl) 2,4,5,6 tetrachlorobenzene; bis(isocyanate methyl ether) of 1,3 bis(hydroxymethyl) 2,4,5,6 tetrachlorobenzene; bis(chloroformomethyl ether) of 1,4 bis(hydroxy methyl) 2,3,5,6-tetrachlorobenzene.

An outstanding feature of our new condensable compounds is that each functional group is removed from the aromatic nucleus by at least one carbon atom of an alkoxy radical. Another characteristic feature is that the remaining positions on the aromatic nucleus are all substituted by halogen atoms. We generally utilize a benzene nucleus substituted by two or three alkoxy radicals bearing functional groups, the remaining positions of which are substituted by chlorine. In the preferred embodiment of our invention the condensable compound is bi-functional and the two alkoxy radicals are methoxy.

In the case of the bi-functional compounds containing a benzene ring, the alkoxy radicals may be substituted in ortho-para- or meta-positions. Where high dielectric constant materials are required the ortho-position is preferred, inasmuch as a higher dipole moment is attained. Notwithstanding the proximity of the two groups, it is possible to completely react and condense such compounds, due to the presence of the intervening alkoxy radicals. In the case of the para-substituted compounds, the structure of the condensation products is more linear in nature, and is additionally characterized by extremely high melting points and excellent thermal stability. Mixtures of the various isomers may be used for many purposes.

Our new compounds undergo condensation with appropriate reactants containing complementary functional groups to produce condensation products having unusual chemical, physical and electrical properties. Usually the functional groups in our compounds are all alike, but this is not necessary. In case they contain different functional groups that are complementary to each other, it is possible to effect self-condensation.

When preparing novel condensation products for our new condensable compounds, we prefer to employ polyfunctional compounds as the other reaction component. Here again the functional groups in such other component are generally, though not necessarily, all the same. They must, of course, be complementary to the functional groups contained in our new condensable compounds, in order to assure the desired reaction. While the other component is preferably polyfunctional, it may also contain but a single complementary functional group, in which case the condensation products formed are of relatively low molecular weight.

Among the types of reactants with which our new condensable compounds having carboxyl, isocyanate and/or chloroformate radicals as functional groups may be condensed are the alcohols, mercaptans (thiols) and amines. As examples of such polyfunctional reactants there may be mentioned ethylene glycol, propylene glycol, butylene glycol, diethylene glycol, triethylene glycol, dipropylene glycol, dimethyloldimethylmethane, 2-mercaptoethanol, di-hydroxyethyl sulfide, glycerol, trimethylolethylmethane, d-sorbitol, d-sorbose, mannitol, hydroxyethyl cellulose, propylene dimercaptan, and hexamethylene diamine.

In case hydroxyl, thiol and/or amino radicals constitute the functional groups in our new compounds, they may be reacted with acids, acid anhydrides and acid chlorides. Among the polyfunctional acids suitable as such reactants are the following: succinic acid, sebacic acid, adipic acid, pimelic acid, suberic acid, azelaic acid, undecanedioic acid, dodecanedioic acid, tetradecanedioic acid, octadecanedioic acid, agathic acid, phthalic acid, and terephthalic acid. The anhydride and phthalic anhydride, and the chlorides of the foregoing acids may also be used.

As in the case of our new condensable compounds, all functional groups of the polyfunctional reactants to be condensed therewith are generally the same. However, it is also possible to employ reactants containing two or more different functional groups. For example, hydroxy alkyl mercaptans, long chain amino alcohols and amino alkyl mercaptans may be used.

As a general rule, we prefer to produce our novel resinous condensation products by reacting two or more bi-functional components. It is possible in this way to obtain linear condensation products of very high molecular weight. However, tri-, tetra- and higher functional components may be employed with good results, producing as the number of functional groups increases harder resins with higher softening points. A typical trifunctional compound is tris(carboxymethyl ether) of 1,3,5, hydroxymethyl 2,4,6,trichlorobenzene. Furthermore, as previously indicated, monofunctional components may be reacted with our new condensable compounds to produce condensation products of relatively low molecular weight.

The condensation of our polyfunctional halogenated aromatic compounds may be effected by heating the reactants, preferably, to temperatures in the order of from 150 to 200° C. The reaction proceeds rapidly during the early stages of heating and gradually slows down thereafter. It may be accelerated by the addition of condensing agents, such as anhydrous zinc chloride. Exceptionally high molecular weights may be achieved by heating the partially condensed reaction mixture at temperatures above 200° C. under greatly reduced pressure. Generally speaking we employ proportions of the reactants that are calculated to be required for complete reaction between the complementary functional groups. Thus, in case both reactants are bi-functional, we customarily employ equimolecular proportions. However, in some cases it may prove desirable to employ an excess of one of the reactants.

The resinous condensation products obtained according to our invention are useful in varied fields. For electrical purposes their flame resistance, high softening point and excellent dielectric properties make them suitable for the coating of various electrical conductors and the impregnation of porous dielectric separators, such as paper. Partially condensed resins, particularly of such reactants that do not evolve water upon condensation, may be used as potting compounds for casting about electrical assemblies and other devices wherein ultimate physical and chemical protection, as well as electrical insulation, are required. Some of the low molecular weight resins prepared according to our invention are tacky and soft at room temperatures and may be used as plasticizers for a wide variety of natural and synthetic resins. The very high molecular weight resins, particularly those of linear character obtainable by condensation of bi-functional components, may be extruded in molten condition through spinning orifices and stretched to form fibers that are highly useful for various textile purposes.

The following example will serve to illustrate the preparation of our new condensable compounds. Obviously, our invention is not limited to the details given in this specific example, but may be varied widely within the scope of the preceding general disclosure.

*Preparation of 1,4-bis-(allyloxymethyl)-2,3,5,6-tetrachlorobenzene.*—A solution of sodium allyloxide in allyl alcohol was prepared by adding sodium (5.0 g.) to allyl alcohol (100 cc.). 1,4-bis-(bromomethyl)-2,3,5,6-tetrachlorobenzene (40.2 g., 0.1 mol) was added to the cooled solution and the mixture was refluxed 1.5 hours. The reaction mixture was then poured into a large volume of water. The product was filtered, washed with water, dried and crystallized from methanol; yield 35 g. (98.4%); M. P. 88–90°.

*Preparation of bis-(carboxymethylether) of 1,4-bis(hydroxymethyl)-2,3,5,6-tetrachlorobenzene.*—A mixture of the 1,4-bis(allyloxymethyl)-2,3,5,6-tetrachlorobenzene (28 g., .0787 mol), potassium permanganate (112 g.), 10% sodium hydroxide solution (28 cc.) and water (1500 cc.) was refluxed 2.5 hours, cooled, acidified with sulfuric acid and refluxed again for one-half hour. The mixture was cooled, and the manganese dioxide was filtered. The solution was made strongly acid with sulfuric acid, and a small amount of sodium bisulfite was added to dissolve the last traces of manganese dioxide. The solution was extracted continuously with ether for 48 hours to yield 11 g. (35.7%) of the dibasic acid; M. P. 320–325° C.

Numerous other bifunctional alkoxy compounds can be prepared in a comparable manner to the example given above, merely by starting with appropriate compounds and processing them by well-known organic techniques to arrive at the desired compounds of the invention. For example, 1,4-bis(bromomethyl)-tetrachlorobenzene is reacted with two mols of ethylene glycol and two equivalents of sodium to yield bis(hydroxyethyl ether) of 1,4-bis-(hydroxymethyl) 2,3,5,6 tetrachlorobenzene. In a similar fashion the initial dibromo compound can be reacted with 1,4-dihydroxybutene,2 and 1,4 dihydroxybutyne,2 in the presence of sodium to yield bis(4,hydroxybuta-2-enyl ether) of 1,4,bis(hydroxymethyl) 2,3,5,6 tetrachlorobenzene and bis(4,hydroxybuta-2-ynyl ether) of 1,4,bis(hydroxymethyl) 2,3,5,6 tetrachlorobenzene, respectively. The bis(beta amino ethyl ether) of 1,4,bis(hydroxymethyl) 2,3,5,6 tetrachlorobenzene is prepared by treating 1,4,bis(bromomethyl) 2,3,5,6 tetrachlorobenzene with hydroxy ethyl amine in the presence of sodium and an inert solvent. By reacting the bis(beta amino ethyl ether) of 1,4,bis(hydroxymethyl) 2,3,5,6 tetrachlorobenzene with phosgene in an inert solvent, bis(beta isocyanato ethyl ether) of 1,4,bis(hydroxymethyl) 2,3,5,6 tetrachlorobenzene is prepared.

While the foregoing examples are concerned with the preparation of bifunctional alkoxy aromatic compounds of the invention, it is apparent that the corresponding trifunctional compounds may be similarly prepared and subsequently condensed according to our invention. As a specific example of this, 1,3,5 tris(bromomethyl) 2,4,6, trichlorobenzene is reacted with three mols of allyl alcohol and three equivalents of sodium in an inert solvent to yield 1,3,5-tris(allyloxymethyl) 2,4,6,trichlorobenzene, which then is reacted with potassium permanganate to yield tris(carboxymethyl ether) of 1,3,5,tris(hydroxymethyl) 2,4,6,trichlorobenzene. The functional hydroxy groups of this compound may readily be converted to other functional groups by various chemical reactions, some of which have been described above and the resultant product may be condensed with reactants containing complementary functional groups.

As previously pointed out, the compounds of the invention are characterized by the high chlorine content, by the ability to condense readily despite the halogen content, and by the excellent chemical, physical and electrical properties of condensation polymers made therefrom. The condensation polymers described herein are useful in a wide variety of fields. As wire enamels and coating lacquers generally, the resins are of utility because of the high softening point, the flame resistance and, in many cases, the resistance to solvents which would normally attack condensation polymers. Certain of the resins are useful as plasticizers for more brittle and fragile resins. Their use with phenol-formaldehyde condensation resins leads to increased adherence of the cured resin to metal surfaces, as well as improved physical properties. In applications of this type, the partially or fully cured resins of the invention are added to the phenolic molding powder.

The condensation polymers may be used in the fabrication of thin filaments and threads useful in the production of flame resistant fabrics.

As many apparently widely different embodiments of this invention may be made without departing from the spirit and scope hereof, it is to be understood that the invention is not limited to the specific embodiments hereof except as defined in the appended claims.

An additional and novel group of compounds which are presently being investigated are believed to be well suited to condensation with the compounds of the invention to yield unusual resins of high desirability. This group is characterized by the presence of the ether linkage directly to the aromatic structure and not isolated from the benzene ring by the alkyl group which characterizes the present invention. An example of this class of compounds is 1,4-bis(hydroxyethyl ether) 2,3,5,6-tetrachlorobenzene.

As many apparently widely different embodiments of this invention may be made without departing from the spirit and scope hereof, it is to be understood that the invention is not limited to the specific embodiments hereof except as defined in the appended claims.

What is claimed is:

1. A compound conforming to the general formula:

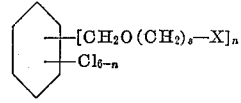

wherein $s$ is an integer from 1 to 4, X is a functional group selected from the class consisting of carboxyl and isocyanate radicals and $n$ is an integer from 2 to 3.

2. A compound conforming to the general formula:

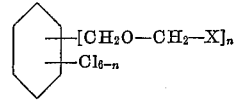

wherein X is a functional group selected from the class consisting of carboxyl and isocyanate radicals and $n$ is an integer from 2 to 3.

3. Bis(carboxymethylether) of 1,4-bis(hydroxymethyl) 2,3,5,6-tetrachlorobenzene.

4. Tris(carboxymethyl ether) of 1,3,5-tris(hydroxymethyl 2,4,6-trichlorobenzene.

5. Bis($\omega$ isocyanato ethyl ether) of 1,4-bis(hydroxymethyl) 2,3,5,6-tetrachlorobenzene.

References Cited in the file of this patent

UNITED STATES PATENTS

| | | |
|---|---|---|
| 2,564,214 | Ross et al. | Aug. 14, 1951 |
| 2,631,168 | Ross et al. | Mar. 10, 1953 |